United States Patent [19]

Schneider

[11] 4,130,870

[45] Dec. 19, 1978

[54] HIERARCHIALLY ARRANGED MEMORY SYSTEM FOR A DATA PROCESSING ARRANGEMENT HAVING VIRTUAL ADDRESSING

[75] Inventor: Peter Schneider, Poecking, Germany

[73] Assignee: Siemens Aktiengesellschaft, Berlin & Munich, Germany

[21] Appl. No.: 832,237

[22] Filed: Sep. 12, 1977

[30] Foreign Application Priority Data

Sep. 16, 1976 [DE] Fed. Rep. of Germany ....... 2641722

[51] Int. Cl.² ............................................... G06F 13/00
[52] U.S. Cl. .................................................... 364/200
[58] Field of Search ........................ 364/200 MS File

[56] References Cited

U.S. PATENT DOCUMENTS

| | | | |
|---|---|---|---|
| 3,412,382 | 11/1968 | Couleur et al. | 364/200 |
| 3,461,434 | 8/1969 | Barton et al. | 364/200 |
| 3,546,677 | 12/1970 | Barton et al. | 364/200 |
| 3,614,745 | 10/1971 | Podvin | 364/200 |
| 3,665,487 | 5/1972 | Campbell et al. | 364/200 |
| 3,778,776 | 12/1973 | Hakozari | 364/200 |
| 3,858,182 | 12/1974 | Delagi | 364/200 |
| 4,035,778 | 7/1977 | Ghanem | 364/200 |

Primary Examiner—Harvey E. Springborn
Attorney, Agent, or Firm—Hill, Gross, Simpson, Van Santen, Steadman, Chiara & Simpson

[57] ABSTRACT

A hierarchially arranged memory system is described for a data processing system having virtual addressing. A three-level working memory is provided, along with an auxiliary memory, in a data processing system containing a secondary buffer between the main memory and a rapid buffer memory. Whereas the main memory contains all actual storage areas, i.e. the memory pages of the inactive processes which were required for the processing period just passed, the actual storage area for the successor process, independent from the operating system, is set independently by its own microprocessor.

10 Claims, 11 Drawing Figures

HIERARCHIALLY ARRANGED MEMORY SYSTEM FOR A DATA PROCESSING ARRANGEMENT HAVING VIRTUAL ADDRESSING

BACKGROUND OF THE INVENTION

1. Field of the Invention

The present invention relates to a hierarchially arranged memory system for a data processing system having virtual addressing and which possesses a peripherally assigned auxiliary memory as a background memory and a multi-level working memory with a main memory and a buffer store of low capacity and short access time, and to a method for carrying out storage operations in such a memory system.

2. Description of the Prior Art

The hierarchial organization of several partial memories into a multi-level memory system of great capacity and an advantageous mean access time has been frequently utilized in order to obtain a considerably greater data flow, not only in large computer systems, but also in medium and even smaller data processing systems. Such memory structures are illustrated extensively, with respect to their properties, for example, in "Electronic Computer Set Ups," 1976, Pages 122-128 in an article entitled "Buffer Storage Structures."

The complete programs of the individual processes, which simultaneously flow in the data processing system, are only placed in the lowest storage level—referenced here as the secondary memory—in all hierarchially organized multi-level storage systems. Each partial memory of the hierarchy level contains only portions of these programs. The loading strategies for these storage systems are therefore essential and, to a great extent, determine their properties. The central processor, or also several processors, of the data processing system first addresses the partial memory of the highest hierarchy level in such a memory system. Not until a so-called "miss," i.e. when the searched storage word is not contained at that level, is the next lower hierarchy level accessed.

Inasmuch as a miss can have different consequences in a partial memory, the following should first be defined here. Except for the secondary memory which is to be understood as a background memory, all partial memories of the hierarchy level are referenced as a working memory system in which a miss in a hierarchy level still permits a direct access to the next lower hierarchy level. Only a miss in the total working memory system requires a page change, i.e. fetching a storage page from the secondary memory.

The storage operation "page exchange," however, is very detailed as it often requires first a removal of a storage page, up to now located in the working memory system, in order to provide room for the missing storage page. Due to the time involved in such an operation, such a page exchange simultaneously makes a process alternation necessary, i.e. a detaching of the process presently in operation by a successor process so as not to keep the requesting processor in a stand-by condition and to thus lower the efficiency of the data processing system too much.

These disadvantages of loading strategy of a page exchange upon request lead to the suggestion to again provide each process, as soon as it replaces an inactive process, with its original actual storage area in the working memory system. Presently, this only means to keep the number of pages ready for a process in the main memory at the beginning of a new operating period, this being the number which was required in the preceding processing period for storage pages for which a storage access resulted. This has the advantage that in a process exchange in the working memory system, first sufficient storage page is available, because a storage page—meanwhile overriden—can be directly fetched from the page memory without previously having to remove a storage page from the working memory system.

It has already been suggested, moreover, to directly provide a process, being processed anew, with its actual previous storage area, i.e. to provide it immediately at the beginning of the new processing period with the storage pages previously required in the program flow. This loading strategy considerably decreases the number of page misses causing a page exchange. A miss can only still occur when the actual storage area made available alters its size in a processing period. However, a page, and therefore a process, exchange or alteration based thereupon cannot be completely eliminated.

Now it is not sufficient to only make available its actual storage area in the lowest hierarchy level of the working memory system—often referenced main memory—for an active process. It also often proves expedient, moreover, to keep the actual storage areas of other, presently inactive processes, ready because those storage areas, for example, only wait for the entry of a storage page from the secondary memory, or for the finishing of an input/output operation of a peripheral apparatus of the data processing system.

To this is added, furthermore, that the operating system of the data processing system per se engages a relatively large portion of the capacity of the working memory system as different operating system functions must be kept "storage-resident" because they are frequently called upon for use. In a multi-program operation of data processing systems having virtual addressing, particularly the page alternation and address translation routines with the simplicity of address translation tables, separately kept for each process, which tables are also maintained by the operating system of the data processing system, can be disadvantageous.

Thus, depending upon the development level and number of processes simultaneously to be processed, a working memory capacity of several mega bytes is already required in present data processing systems. The storage capacity required for storage-resident system functions can thereby readily lie in the magnitude of 100 KB. As in each partial memory—in hierarchially arranged storage system—of higher hierarchy level, again and again only takes over a partial area of the next lower hierarchy level, does this mean a main memory capacity in the magnitude of mega bytes.

However, such large main memories are so expensive that one must make an attempt to provide presuppositions so that less expensive storage media can be utilized, such as CCD memories. However, these less expensive storage media—in the present state of technology—have access times which are longer, in general, by one magnitude, which then considerably diminishes the output of the data processing system.

SUMMARY OF THE INVENTION

The primary object of the present invention, therefore, is to provide a hierarchially arranged memory system of the type mentioned above which allows—by means of its structure—the utilization of a less expensive storage medium for the main memory regardless of a longer access time, but without decreasing the system output.

The above object is realized by the provision of a main memory which has a sufficient storage capacity for storing the actual storage areas of all processes which are to be simultaneously processed in a multiprogram operation, a secondary buffer inserted between the main memory and the buffer store close to the processor in the storage hierarchy, in which the actual storage areas of an active process and its successor process can be stored in one processing period along with the storage-resident system functions, and a microprocessor which is only triggered by the operating system of the data processing system and independently maintains the storage location of the storage buffer and controls the flow of the program data between the main memory and the secondary buffer in process alternations.

The storage system comprises a three-level working memory system and a secondary memory. The former contains a secondary buffer in which the actual storage area of the processes following in sequence can be set during the processing period of a process. The program data of the following process are therefore waiting in the secondary buffer in a process alternation. The secondary buffer can nevertheless be negligibly small as it—aside from the page frames for two actual storage area of processes of, for example, 128 KB—in addition only has to contain a corresponding capacity for a few operating system routines which are rapidly required again and again. A capacity of 256–512 KB is therefore sufficient for the secondary buffer so that a more rapid storage medium can be utilized at favorable expense. The system access time in such a structure of the working memory system is basically limited to the access time the two working memory levels, buffer memory and secondary buffer, so that there, also, approximately the same output can be obtained as in a two-level working memory system having more rapid storage media.

An additional essential advantage of this solution to the problem resides in the fact that a storage system constructed in such a manner can readily be maintained by means of already existing operating systems. This is based on the fact that the storage location in the secondary buffer is maintained by its own microprocessor. It maintains, for this purpose, the necessary tables independently, carries out additional entries into the system tables maintained by the operating system dependent on the solution, and controls the transport of the program data between the main memory and the secondary buffer. For the operating system this three-level working memory system is therefore apparently similar to a two-level working memory system comprising a rapid buffer store and a main memory. Therefore, from the structural standpoint, the present invention requires minimum adjustments in the operating system of the data processing system that the expense involved is negligible.

In comparison to known memory system, the properties of this solution in a further development of the invention are particularly advantageously expressed in that the invention is characterized in that the main memory is structured as a CCD memory, and the secondary buffer is constructed as a MOS memory. In these storage media the main memory can be particularly inexpensively provided with a corresponding storage capacity, and the secondary buffer can simultaneously be structured of a more expensive storage medium due to its lower capacity which, however, facilitates a favorable access time.

BRIEF DESCRIPTION OF THE DRAWINGS

Other objects, features and advantages of the invention, its organization, construction and operation will be best understood from the following description taken in conjunction with the accompanying drawings, on which.

DESCRIPTION OF THE PREFERRED EMBODIMENTS

Figure 1:
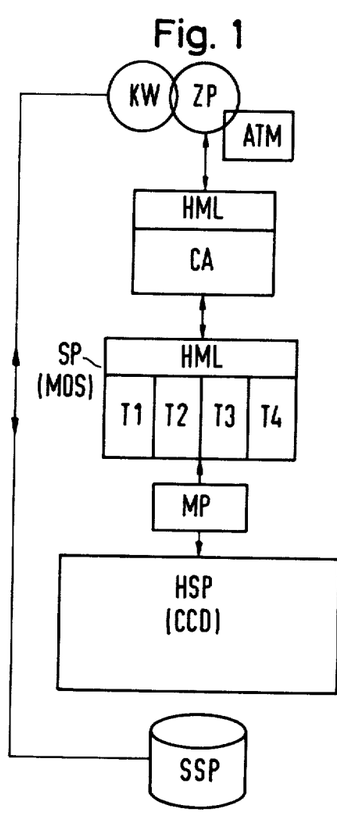
FIG. 1 is a schematic block diagram of a data processing system having a memory system constructed in accordance with the present invention.

FIG. 1 is a schematic block diagram illustration of a data processing system for virtual addressing and having a hierarchially constructed memory system. A central processor ZP is provided in the place of several processors, to which a small address memory ATM is assigned, and communicates with a three-level working memory system comprising a rapid buffer store CA of low capacity and short access time, a secondary buffer SP constructed in the MOS technique, and a main memory HSP constructed in the CCD (charge coupled device) technique. The two uppermost hierarchy levels respectively contain one hit/miss logic HML which permits determining whether a memory access can be operated from the respective store. Between the secondary buffer SP and the main memory HSP a microprocessor MP is illustrated in order to indicate schematically that the microprocessor controls the data exchange between the two stores.

Finally, the lowest hierarchy level forms a backing or secondary memory SSP which is constructed, for example, as an alternate disc memory, and completely stores the programs of all processes presently in operation. The secondary memory SSP can only be accessed by way of a channel mechanism KW assigned to the central processor ZP, the channel mechanism being by way of which required storage data can be loaded into the main memory HSP and into the secondary buffer SP with the activation of a program. Hierarchially arranged working memory systems, as is well known in the art, permit the operational efficiency of one or more rapid processes of the data processing system being utilized, in that as many memory accesses as possible are operated from a storage medium with the least possible access time. With consideration for the expense of a rapid working memory system and the oppositely oriented request for a short average access time, only about 95% of the memory accesses are to be operated from the rapid buffer store CA, and the remaining 5% are to be operated as complete as possible from the secondary buffer SP in one program flow in the three-level working memory system illustrated.

Thereto, the respectively active storage area of a process must be contained in the buffer store SP, that process with the aid of which that section of the virtual memory is referenced which is accessed in a processing period. Of course, the size of this area is dependent upon the program. Frequently, the area comprises about 32 storage pages, as examinations have shown. A storage area of 64 storage pages having 2 KB, respectively, is therefore seldom exceeded. For an active process, i.e. presently to be processed by the data processing system, in a portion T3 or T4 by the secondary buffer SP, 128 KB, i.e. 64 storage pages, are made available by the data processing system, the two first parts T1 and T2 of the secondary buffer SP are reserved for the operating system, as indicated on the drawing, by means of shading.

The main memory HSP is selected to have sufficient capacity that it can accommodate all active storage areas of the processes presently flowing in the multi-program operation. Then, only one data transport between the main memory HSP and the secondary buffer SP is required in a process alternation. This structure also does not prevent that alternations in the active storage area of a process lead to a page error in which a storage page has to be first transmitted from the secondary store SSP into the main memory HSP. This storage page thereby replaces a page not required any longer or replaces the storage page of the active storage area of this process which has been stored in the main memory HSP the longest time.

This storage structure requires a corresponding storage location maintenance which will be explained in the following. It has already been pointed out that the two shaded parts T1 and T2 of the secondary buffer SP are not accessible for storage data for active processes. The first part T1 of the secondary buffer SP is reserved for frequently used operating system functions of the data processing system which are therefore considered storage-resident. The second part T2 in the secondary buffer SP is reserved for the programs and tables of operational system functions which serve the storage location maintenance, the address translation, or a page alternation. The system programs and tables for the address translation therein take up a great share as each process is assigned with its own translation tables for translating virtual addresses into real addresses.

Figure 2:
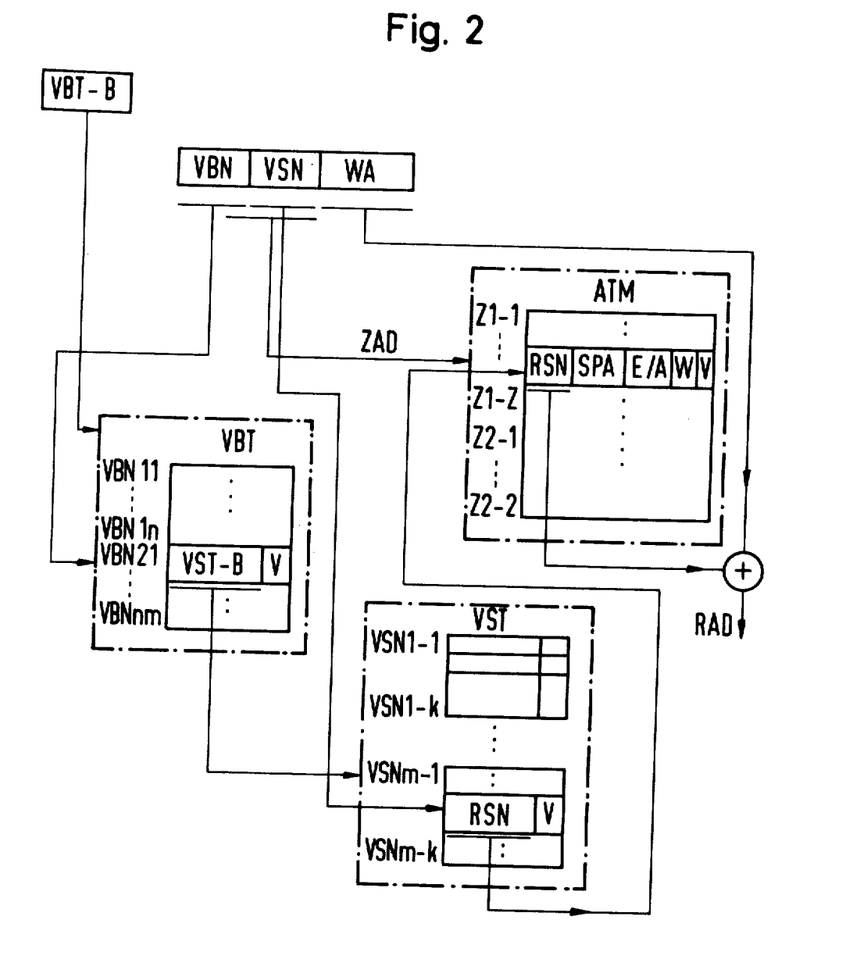
FIG. 2 is an illustration, in block diagram form of a two-level translation device for translating virtual addresses into real addresses with the aid of corresponding address translation tables.

The translating routine, known as such, is subsequently indicated with the aid of FIG. 2, and only to such an extent as is required for the understanding in the present case. A complete virtual address VAD comprises a virtual block number VBN, a virtual page number VSN and a word address WA to be stored here in a storage address register. In addition to the two-level address translation, here indicated as an example, two different types of translation tables, the virtual block tables VBT and the virtual page tables VST are provided. The former are illustrated in FIG. 2 as a single table. They can be accessed with the aid of a base address VBT-B recorded in a register. The block tables VBT in consecutive sequence contain an entry line for each virtual block number VBN of each of n processes. The entry line essentially contains one base address VST-B for one of several virtual page tables VST which are constructed analogously to the block tables, and which assign, in consecutive sequence, a real page number RSN to each virtual page number VSN, the real page number referencing a page frame of the main memory HSP.

In repeated accesses to a storage page the address is not translated again each time. For this purpose, a translated real page number RSN is buffered in an entry line of an address memory ATM. This entry line is addressed with an intermediate storage address ZAD formed from a portion of the virtual block number VBN, and the virtual page number VSN. The entry line in the address memory ATM contains the real page number RSN which, together with the word address WA, results now in a complete real storage address RAD, an additional characterizing entries which—depending on the case—are also utilized in other system tables, and are subsequently explained below in detail. These address translation tables VBT and VST are to be placed in the second part T2 of the secondary buffer ST; however, the address memory ATM is generally structured as its own small memory and directly assigned to the central processor, as indicated in FIG. 1.

Figure 3:
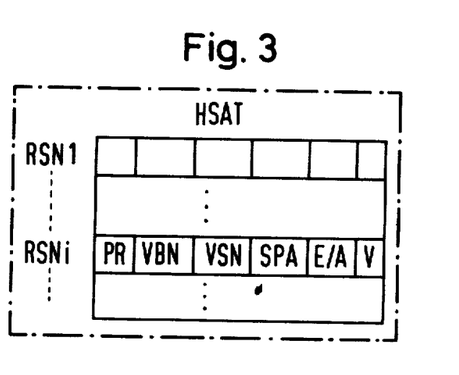
FIGS. 3–6 illustrate additional system charts which are required for the storage location maintenance or for controlling storage operations.

The virtual page table VST per se indirectly describes the actual content of the main memory HSP. At present, however, it is often common to directly define the page assignment in the main memory by means of a single system table, the page allocation table HSAT which is schematically illustrated in FIG. 3 and which comprises a number of entry lines corresponding with the number of page frames of the main memory HSP, the entry lines which can be addressed in consecutive sequence by means of the assigned real page number RSN. The engagement of the page frame in correspondence with the real storage pages is described in each entry line by means of a process number PR and the virtual address of the storage page contained, i.e. by means of a virtual block number VBN and a virtual page number VSN.

Figure 4:
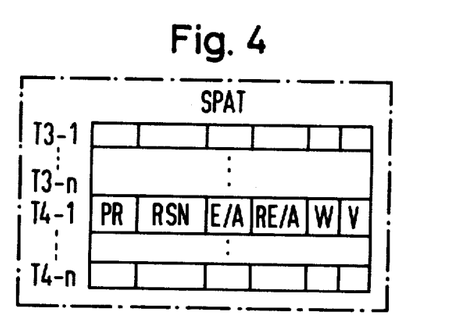

The second part T2 of the secondary buffer, in the present case, contains an additional table, comparable with the page allocation table HSAT for the main memory HSP, reproducing the actual availability of the secondary buffer SP. The page allocation table SPAT for the secondary buffer SP is schematically illustrated in FIG. 4. Its entry lines—arranged in accordance with real addresses of the page frames of the data part of the secondary buffer SP—identify the storage pages, contained therein, with the aid of the process number PR, and the real page number RSN.

These tables, described above, function for the organization of a memory access including the reloading of storage pages into a higher hierarchy level or a lower hierarchy level of the memory system. In addition thereto are additional system tables, maintained by the operating system which are, however, only indicated here when they are to be utilized in the present case.

Figure 5:
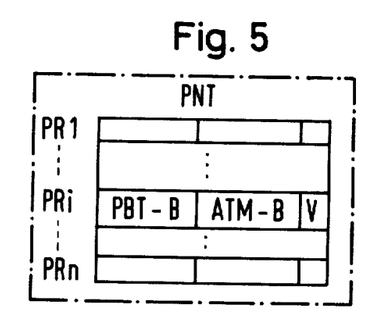
Figure 6:
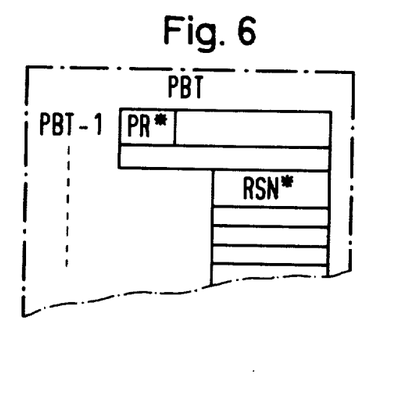

This holds true, for example, for a process number table PNT which is schematically illustrated in FIG. 5 and which permits an overview across the processes to be processed independently from their active or inactive condition. To each process, referenced by its process number PR, an entry line is assigned in consecutive order. The entry line primarily contains a real base address PRT-B for a block having control data, the block being contained in an additional system table within the process control block table PBT schematically illustrated in FIG. 6, along with the base address ATM-B for the process-related entries in the address memory ATM and additional identification bits. The system table contains all control data for a process alternation. In the present context, this primarily means that in the process control block assigned to a process the previously actual storage area of the successor process PR* is listed with the aid of the real page numbers RSN*, among others, and only the entires of interest here are therefore listed.

The above explanation of the content of the secondary buffer SP would be incomplete without an indication with respect to the parts of thise store which are accessible to the program data. As mentioned above, a storage capacity of, for example, 1–128 KB is provided in the secondary buffer SP for the storage area of the process presently active. Now, in the process alteration, however, the storage area of the successor process to be activated has to be sequentially input into the secondary buffer SP from the main memory HSP by way of an interface, for example, only 8 byte wide. Nevertheless, in order to avoid waiting times in a processing operation, and to also obtain an advantage vis-a-vis the existing loading strategy of loading a storage page upon request, the actual storage area for a successor process is to be already entered into the secondary buffer SP during the processing of the preceding processes. For this reason, the two parts T3 and T4 of equal size of the secondary buffer SP are provided for the actual storage areas of two consecutive processes, so that at any time one part is made available for the program processing and the other part is made available for the loading of the successor process. Thus, the access time of the three-level working memory system (comprising a buffer store CA, a secondary buffer SP and a main memory HSP) is reduced to the access time of a two-level storage system which has a buffer store CA and a secondary buffer SP.

To produce a completely new storage location maintenance for such a hierarchially constructed working memory system would be inexpedient due to the expense in new software which would be required. The storage location maintenance for the secondary buffer SP and the main memory HSP, therefore, must be capable of being readily insertable into operating systems for present hierarchially constructed working memory systems which have a buffer and a main memory. The maintenance of the storage location in the secondary buffer SP is therefore taken over by its own microprocessor MP. The task of the microprocessor MP is, in particular, to load the actual storage area of the respective successor processes and to block storage pages in the secondary buffer SP in the case of input/output operations, or in page alternations against overwriting. The microprocessor MP is activated by signals of the central processor ZP emitted due to an existing operation system. Additional control signals for the microprocessor MP are derived from the identification bits, already mentioned above, in the entries of the system tables. The significance of these identification bits will now be explained.

The complete set of the above-mentioned identification bits is contained, for example, in the page allocation table SPAT, illustrated in FIG. 4 for the secondary buffer SP. An identification bit, hereinafter referenced the E/A bit, defines an input/output operation of the appertaining storage page, yet to come, if the identification bit is in the condition of "1." With the aid of a second identification bit, hereinafter referenced the RE/A bit, when in the condition "1," indicates that such an input or output transfer has already been completed. A third identification bit, hereinafter referenced the W bit, identifies storage pages in the condition "1," into which write-entries were made during the processing of a program. A fourth identification bit, hereinafter referenced the V bit, defines the appertaining entry line as being true in condition "1," and thus characterizes the storage pages of the process, presently being carried out, in the page allocation table SPAT of the secondary buffer SP.

Three conditions for storage pages can be derived from the combination of these identification bits. Storage pages which are to participate in an input/output transfer can be recognized by the combination E/A = 1, W = 0 and V = 0. The actual storage area of a process is described by the combination E/A = 1, W = 1 or 0 and V = 1. A third combination E/A = 0, W = 1 or 0 and V = 0 characterizes those storage pages in the secondary buffer SP which are released for replacement, i.e. for the overwriting in the secondary buffer SP.

The following is an explanation as to how the signals supplied by the central processor ZP are utilized for a process alternation SPW or an input/output operation SE/A together with the explained identification bits from the microprocessor MP for the control of the storage location distribution in the secondary buffer SP. For this explanation, the structure and operation of microprocessors will not be given in that the same is well known to those skilled in the art; only the association of a microprocessor in connection with memory structures according to the present invention is treated herein. Due to the volume of the data transfer to be controlled by the microprocessor in the present exemplary case of utilization, however, only a bipolar and therefore comparatively rapid microprocessor can be considered. Due to this functionally insignificant limitation, the function of the microprocessor MP is here only described to such an extent that the corresponding processor routines can be readily derived therefrom. The construction in regard to hardware is only dealt with where necessary for the illustration of this function.

Furthermore, not all causes for a process alternation in the multi-program operation are to be illustrated in detail herein, and not all criteria are to be developed which determine the successor processes in a process alternation. All this is the task of the operating system of a data processing system. It is only of interest here that the input/output operations, or the fetching of storage pages into the secondary buffer, among other operations, can also be causes for a process alternation of which the microprocessor MP is informed via corresponding control signals SE/A or SPW, respectively.

These control signals have various presuppositions in regard to the working memory system. In a page alternation, the storage page often has to be first entered into the secondary buffer SP from the main memory HSP, as always such pages are being selected on the basis of the replacement algorithm, these pages being those which were not accessed for the longest interval of time. However, in input/output operations, the storage page considered normally belongs to the active storage area of the operating process and is already located, for this reason, in the secondary buffer SP. Nevertheless, storage pages which share time in the operations mentioned, are additionally accessed precisely once so that they are available at the secondary bufer SP, at any rate.

Additionally required storage pages for input/output operations may not participate in a page alternation, i.e. may not be removed in the secondary store SSP. In known working memory systems this is obtained with the aid of the page allocation table HSAT which describes the availability of the main memory HSP. There, each storage page which participates in an input/output operation is identified by the operating system by means of setting the E/A bit. With such a marking, these pages are protected against removal into the secondary store SSP; however, it is not yet safeguarded that these pages are also held in the secondary buffer SP until the input/output operation has been completed. The same also holds true for page frames in the secondary buffer SP which are still required, in reverse, for the entry of the storage pages from the secondary store SSP.

Figure 7:
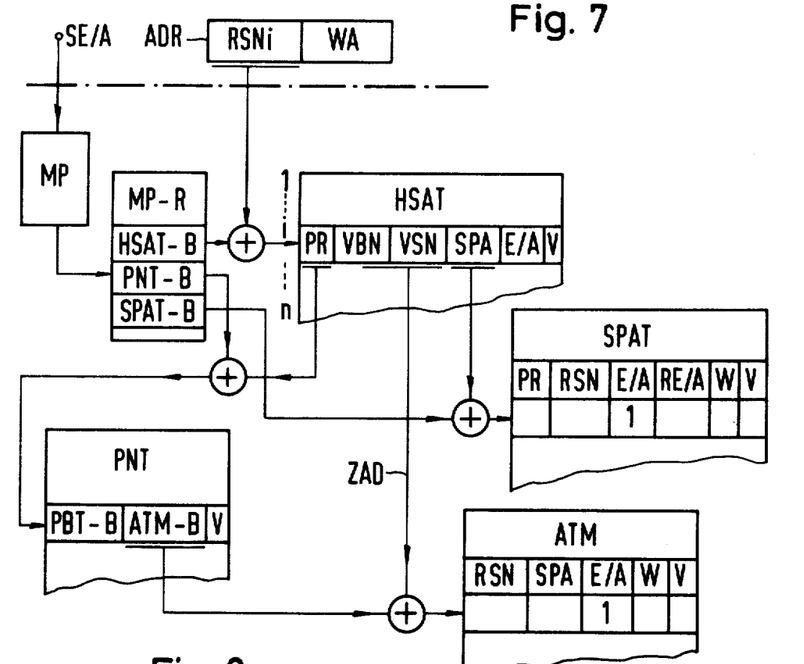
FIG. 7 is a schematic representation, in block diagram form of a process of blocking storage pages in the working memory system which must be protected from a removal into the secondary memory.

FIG. 7 schematically illustrates how this blocking process of the storage pages flows in the present working memory system. The microprocessor MP, triggered by a signal for a process alternation SPW, in this blocking process accesses several entries with base addresses for system tables placed in microprocessor registers MP-R. The microprocessor MP thereby fetches, first of all, the base address HSAT-B for the page allocation table HSAT of the main memory HSP from one of these registers, and there accesses the i-th entry line of the system table with the aid of a real storage address RSNi which is standing by in an address register ADR. This is schematically illustrated in FIG. 7 such that the base address HSAT-B of the page allocation table HSAT is added to the real storage page number RSNi to form a complete storage address.

From the entry line of the page allocation table HSAT, thus addressed, whose E/A bit is set "1" by the operating system, an entry SPA is first taken out by the microprocessor MP. This entry—together with a base address SPAT-B for the page allocation table SPAT of the secondary buffer SP being associated with an additional microprocessor register MP-R—represents a complete storage address for an entry in the secondary buffer SP. In this entry line of the page allocation table SPAT of the secondary buffer SP, thus addressed, the E/A bit is now set by the microprocessor MP, and the removal of this storage page from the secondary buffer SP is thus blocked. Moreover, the E/A bit is also set in the address memory ATM by means of the microprocessor MP. The address for the corresponding entry line of this address memory ATM results on the basis of the processor number PR and the base address PNT-B stored in an additional microprocessor register MP-R for the process number table PNT. The base address ATM-B for the address memory ATM is contained in the process number table, the address memory whose corresponding entry line is addressed via an intermediate address ZAD, as was explained above in connection with FIG. 2.

Figure 8:
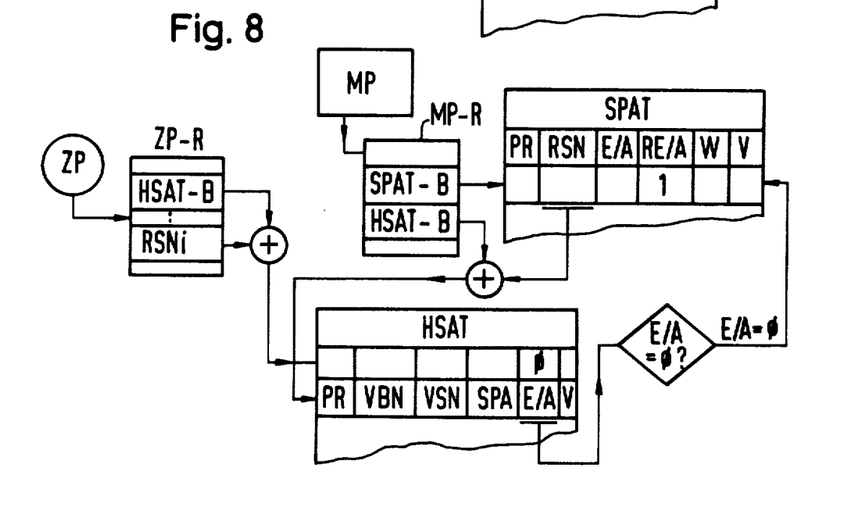
FIG. 8 is a schematic illustration of the reverse process of releasing blocked storage pages.

The reverse process of releasing blocked storage pages after the execution of an input/output operation is illustrated in FIG. 8. The page allocation table HSAT of the main memory HSP is addressed by the operating system with the aid of the central processor, and an entry line is selected on the basis of the real page number RSNi and the E/A bit is reset in that entry line.

The microprocessor MP which independently controls the page allocation table SPAT of the secondary buffer SP, interrogates that table as to which entries are identified by a set E/A bit. The microprocessor removes the real page number RSN from the identified entry lines and adds that entry number, together with the base address HSAT-B for the page allocation table HSAT of the main memory HSP, into a complete storage address, and thus addresses an entry line in this system table. With this, the E/A bit is read out. If it is already set, the RE/A bit is set in the page allocation table SPAT of the secondary buffer SP by means of the microprocessor MP, and the blocking of the corresponding storage page of the secondary buffer SP is thus terminated. The E/A bit in the address memory ATM is not altered. This entry in the address memory ATM is not altered until removal of storage pages.

These processes for input/output operations or page alternation operations, proceed in the same manner. The E/A storage pages, which are no longer required, are not removed to the main memory HSP until storage space is required in the secondary buffer SP. The storage pages in the secondary buffer SP must be blocked for a process alternation only with the causes mentioned, whereas otherwise the setting of the active storage area of the successor process can be started immediately.

Figure 9:
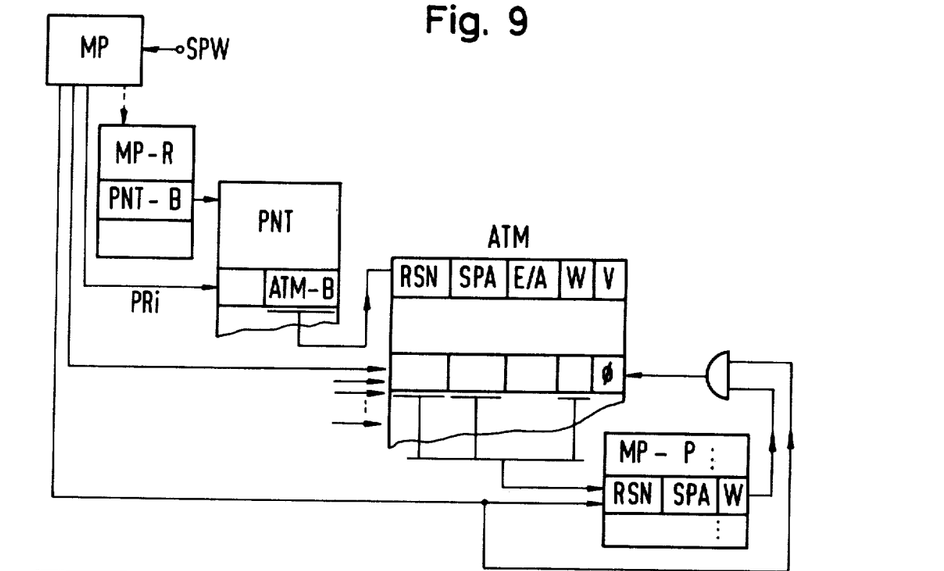
FIG. 9 illustrates a process of making control information available by way of a process to be relieved in a process alternation.
Figure 10:
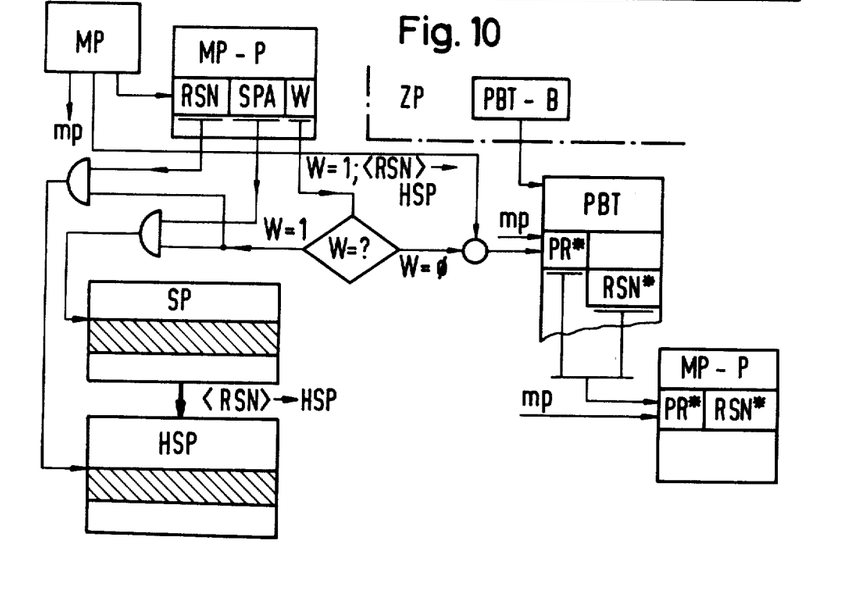
FIG. 10 is a schematic illustration of the process of saving program data of the process to be relieved and the making available of control information by way of the successor processes, shown in a block diagram form.

FIGS. 9 and 10 illustrate how this process is carried out in a process alternation. First of all, all released page frame of the preceding process must be identified. This proceeds in the corresponding entry lines in the address memory ATM. As illustrated in FIG. 9, the microprocessor MP respectively removes the secondary buffer address SPA from these entries, i.e. the address of an entry line in the page allocation table SPAT of the secondary buffer SP for the storage pages to be overwritten, the real page numbers RSN and the W bit.

The microprocessor MP fetches the base address PNT-B for the process number table PNT from one of the microprocessor registers MP-R, and reads the base address ATM-B for the entries which appertain to the process out of the entry line corresponding with the process number table for the previous process PRi in the address memory ATM. The real page numbers RSN, the secondary buffer address SPA and the W bit are read out into a line of a data buffer MP-P of the microprocessor, in sequence. Simultaneously, the read entry is identified as valid in the address memory ATM with the resetting of the V bit by means of the microprocessor MP. The information is thus obtained as to which storage pages are to be released for overwriting.

FIG. 10 illustrates, on one hand, how this information is further processed and how the information, on the other hand, is obtained concerning the active storage area of the successor process. First of all, a differentiation must be made as to whether entries were made into the released storage pages during the course of processing the previous process. For this purpose, the microprocessor MP sequentially reads the entries in its data buffer MP-P and examines the W bit. Only if the W bit is set "1" is the appertaining storage page to be transferred into the main memory HSP from the secondary buffer SP because its content has altered. The two storage addresses necessary for this operation, the secondary buffer address and the main memory address, are, as described above, formed from the secondary buffer address SPA or the real page number RSN, respectively, with the base addresses, no longer illustrated. Then the content of the storage page of the previous process defined by the real page number RSN can be transferred from the secondary buffer SP into the main memory HSP.

The logic flow shown in FIG. 10 now illustrates that the evaluation of the information follows via the storage pages of the successor process to be set. However, this is not absolutely necessary in this chronological logic flow because the formation of this information per se is independent of the removal of the released storage pages into the main memory HSP. The base address BPT-B for a control block in the process control block table PBT is supplied by the central processor ZP by way of the successor process for the information required by the microprocessor MP as the operating system of the data processing system determines the successor process. With the aid of this base address, the microprocessor MP can access the process control block PBT-n, thus defined, which is indicated in FIG. 10 by a control line referenced mp. The microprocessor MP reads the process number PR* of the successor process from this process control block and also the real page numbers RSN* listed there, and also enters the same into the data buffer MP-P. With this action, the microprocessor also possesses the information concerning the active storage area to be set for the successor process.

Figure 11:
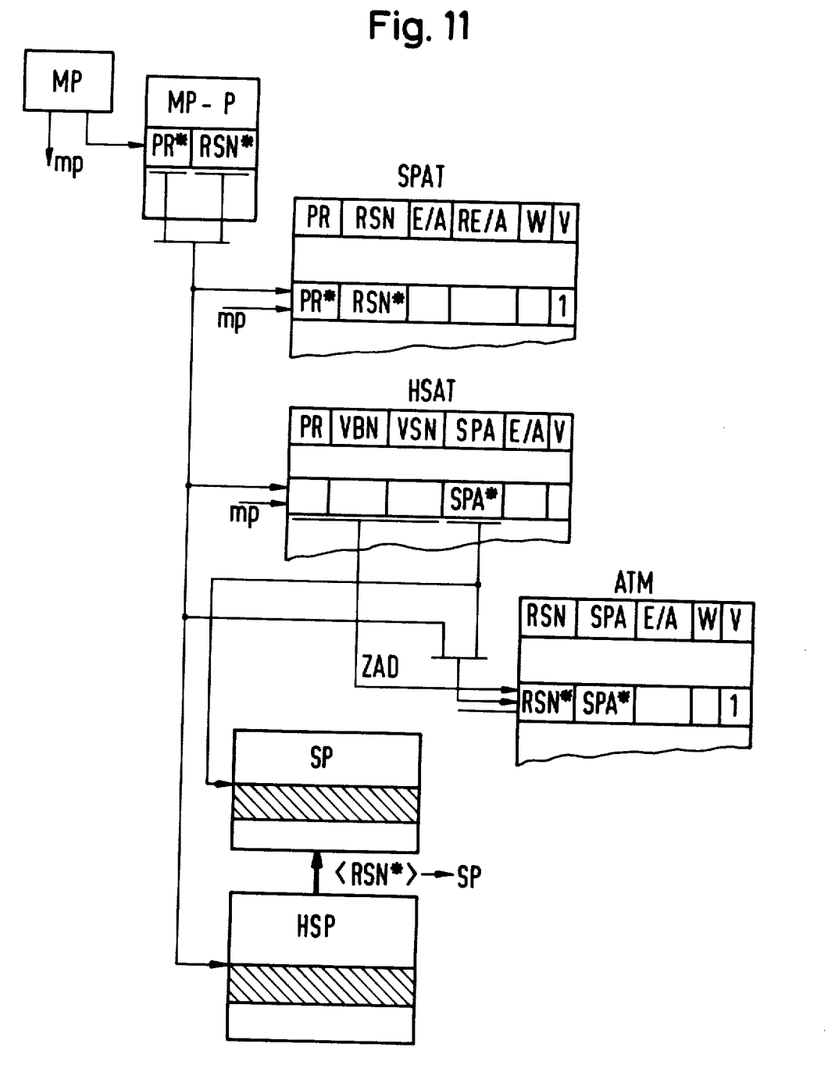
FIG. 11 illustrates, in block diagram form, the control of making the actual storage area available in a successor process in a process alternation.

FIG. 11 illustrates how the process for setting the active storage area proceeds for a successor process. The microprocessor MP sequentially reads out the entries of its data buffer MP-P having the real page numbers RSN* of the successor process identified by the process numbers PR* and transfers these entries into an entry line of the page allocation table SPAT of the secondary buffer SP. This entry line is addressed with the address SPA identifying a page frame released in the secondary buffer SP, the address which, as illustrated in FIG. 9, is also located in an entry of the data buffer MP-P. This entry is thereby identified as valid by means of setting the V bit. In parallel thereto, the page allocation table HSAT of the main memory HSP must be completed. The secondary buffer address SPA* of this storage page of the successor process is entered by the microprocessor MP into the entry line identified with the aid of the real page number RSN* of the successor process.

Now, only the completion of the address memory ATM is lacking. The addresses for the entry lines of this memory are formed in the same manner as explained with respect to FIG. 2 from the respective virtual addresses which are located in the page allocation table HSAT of the main memory HSP. The real page numbers RSN* or the secondary buffer address SPA* of the storage pages of the successor process are entered into the address entries by the microprocessor MP, and then these new entries are also identified as valid by means of setting the V bit. Analogous to the process for removal of storage pages—during the running of a process—the setting of the storage pages in the secondary buffer SP for the successor process runs in parallel thereto by means of transferring the content of a selected storage page from the main memory HSP into the secondary buffer SP.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A hierarchially arranged memory system for a data processing system, with virtual addressing and which comprises:
   a multi-level working memory including a main memory and a low capacity buffer store with a short access time;
   a peripherally assigned secondary memory as a backing memory;
   said main memory having a storage capacity sufficient to store the actual storage areas of all processes which are simultaneously processed in a multi-program operation;
   a secondary buffer connected between said buffer store and said main memory for storing the actual storage areas of an active process and its successor process along with storage-resident system functions in one processing period; and
   a microprocessor connected to said secondary buffer and to said main memory, said microprocessor triggered by the operating system of the data processing system to control the transfer of program data between said main memory and said secondary buffer in process alternations.

2. The memory system of claim 1, wherein said main memory is constructed as a CCD memory and said secondary buffer is constructed as a MOS memory.

3. The memory system of claim 1, wherein said secondary buffer comprises four equal parts, a first part for storing storage-resident functions of the operating system, a second part for storing address translation functions and program alternation functions, and a third part and a fourth part for storing actual storage areas of the active and successor processes, respectively.

4. The memory system of claim 3, wherein
   a first page allocation table, controlled by the operating system of the data processing system for the main memory, and a second page allocation table for the third and fourth parts of said secondary buffer for the program data are contained in the first and second parts of said secondary buffer which are reserved for storage-resident system functions;
   said parts each having a plurality of entry lines, said parts which reproduce the actual availability of the main memory and the secondary buffer, respectively, and which have an entry line for a page frame of the assigned stores in consecutive sequence in which entries for a complete virtual address of a storage page and a secondary buffer address are provided in one case and entries for a main memory address with the aid of a real page number and a process number and a plurality of identification bits are provided in another case;
   a first identification bit identifies an input/output operation of the appertaining storage page to be carried out, a second identification bit identifies the completion state of the input/output operation, a third identification bit identifies a write-in into the storage page during the previous processing period, and a fourth identification bit identifies the entry in the respective line as valid as soon as the respective bits are in a predetermined binary state.

5. The memory system of claim 4, comprising
an address memory including entry lines addressable with a part of a virtual address of a storage page and which contain entries for the real page addresses and at least the first, third and fourth identification bits.

6. A method for executing storage operations in a hierarchially arranged storage system for a data processing system having virtual addressing and which possesses a peripherally assigned secondary memory as a backing memory, a multi-level working memory including a main memory and a low capacity buffer store having a short access time, the main memory having a storage capacity sufficient to store the actual storage areas of all processes which are simultaneously processed in a multi-program operation, a secondary buffer connected between the buffer store and the main memory for storing the actual storage areas of an active process and its successor process along with storage-resident system functions in one processing period, a microprocessor connected to the secondary buffer and to the main memory and triggered by the operating system of the data processing system to control the transfer of program data between the main memory and the secondary buffer in process alternations, the secondary buffer having four equal parts of which a first part stores storage-resident functions of the operating system, a second part stores address translation functions and program alternation functions, and third and fourth parts store actual storage areas of the active and successor processes, respectively, and wherein there is a first page allocation table, controlled by the operating system and a second page allocation table for the third and fourth parts of the secondary buffer for the program data, which tables are contained in the first and second parts of the secondary buffer reserved for storage-resident system functions, and wherein each of the parts has a plurality of entry lines and reproduce the actual availability of the main memory and the secondary buffer, respectively, and which have an entry line for a page frame of the assigned stores in consecutive sequence in which entries for complete virtual address of a storage page and a secondary buffer address are provided in one case and entries for a main memory address with the aid of a real page number and a process number and a plurality of identification bits are provided in another case, and in which a first identification bit identifies an input/output operation of the appertaining storage page to be carried out, a second identification bit identifies the completion state of the input/output operation, a third identification bit identifies a write-in into the storage page during the previous processing period, and a fourth identification bit identifies the entry in the respective line as valid as soon as the respective bits are in a predetermined binary state, and wherein an address memory is provided and includes entry lines which are addressable with a part of a virtual address of a storage page and which contain entries for the real page addresses and at least the first, third and fourth identification bits, the improvement therein comprising the steps of:

feeding a process alternation signal to the microprocessor in a process alternation to trigger the microprocessor to address entry lines in the address memory assigned to the process to be relieved, reading the real page number and the secondary buffer address and the third identification bit, intermediately storing the entries for each read entry line of the address memory in a microprocessor buffer as control information concerning the process to be relieved, feeding a base address for a process control block to the microprocessor to the first part of the secondary buffer to define control data for the successor process and including the process number to be set which defines the storage area of the process with the aid of the real page number, and feeding the entries to the microprocessor buffer so that the control information concerning the successor process is also available to the microprocessor.

7. The improved method of claim 6, comprising the steps of:

addressing the lines of the microprocessor buffer assigned to the process to be relieved in consecutive sequence, reading the respective third identification bit to determine whether an entry was made to the released storage page during the previous processing period, addressing the two storage parts of the secondary buffer when an entry was made into the released storage page in the previous processing period, and addressing the main memory, respectively, with the aid of the addresses taken from the entry selected, and transferring a storage page from the secondary buffer into the main memory.

8. The improved method of claim 7, comprising the steps of:

reading, with the microprocessor, the entries assigned to the process in the microprocessor buffer and setting the actual storage area of the successor process in a process alternation in consecutive sequence, entering such entries into the entry lines of the page allocation table of the secondary buffer assigned to the page frame released, identifying such entries as valid by setting the fourth identification bit, entering the secondary buffer address in the page allocation table for the main memory into the entry line determined by the read real page number, addressing, with the virtual address received from the addressed entry line of the second table an entry line in the address memory, entering the two storage addresses of the storage page in the main memory and the secondary buffer, indicating the entries as valid by setting the fourth identification bit, and addressing the main memory and the secondary buffer, respectively, with these two addresses and triggering a transfer of the addressed storage page from the main memory into the secondary buffer.

9. The improved method of claim 8, comprising the steps of:

triggering the microprocessor with a control signal for an input/output operation to block storage pages which have been kept ready for an input/output operation by reading the real page number from a memory address register corresponding to entry line addresses in the page allocation table for the main memory.

reading the page buffer address and addressing an entry line in the page allocation table of the secondary buffer, forming an intermediate address for an entry line of the address memory with virtual addresses of the block and page numbers from the page allocation table of the main memory, and setting the first identification bit in the selected entry lines of the page allocation table of the secondary buffer and address memory, respectively.

10. The improved method of claim 9, comprising the following steps for the release of blocked storage pages after an input/output operation has been carried out:

resetting the first identification bit in the page allocation table of the main memory, reading the real page numbers from the secondary buffer of the entries of the blocked storage pages, addressing an entry line of the page allocation table of the main memory, and setting the second identification bit in the selected entry line of the page allocation table of the secondary buffer when the first identification bit read from the page allocation table of the main memory is in a reset condition.

* * * * *